United States Patent
Jin

(10) Patent No.: US 10,778,949 B2
(45) Date of Patent: Sep. 15, 2020

(54) ROBUST VIDEO-BASED CAMERA ROTATION ESTIMATION

(71) Applicant: Adobe Inc., San Jose, CA (US)

(72) Inventor: Hailin Jin, San Jose, CA (US)

(73) Assignee: Adobe Inc., San Jose, CA (US)

( * ) Notice: Subject to any disclaimer, the term of this patent is extended or adjusted under 35 U.S.C. 154(b) by 1116 days.

(21) Appl. No.: 13/725,041

(22) Filed: Dec. 21, 2012

(65) Prior Publication Data

US 2013/0265439 A1  Oct. 10, 2013

Related U.S. Application Data

(60) Provisional application No. 61/621,365, filed on Apr. 6, 2012.

(51) Int. Cl.
| | |
|---|---|
| *H04N 13/10* | (2018.01) |
| *H04N 13/00* | (2018.01) |
| *G06T 7/70* | (2017.01) |
| *G06T 7/246* | (2017.01) |
| *G06T 7/579* | (2017.01) |

(Continued)

(52) U.S. Cl.
CPC .......... *H04N 13/10* (2018.05); *G06K 9/3233* (2013.01); *G06K 9/3241* (2013.01); *G06K 9/3275* (2013.01); *G06K 9/4652* (2013.01); *G06T 5/001* (2013.01); *G06T 7/246* (2017.01); *G06T 7/579* (2017.01); *G06T 7/70* (2017.01); *H04N 5/232* (2013.01); *H04N 13/00* (2013.01); *H04N 17/002* (2013.01); *G06T 2200/04* (2013.01); *G06T 2207/10012* (2013.01); *G06T 2207/10016* (2013.01); *G06T 2207/20164* (2013.01);

(Continued)

(58) Field of Classification Search
USPC .......................................................... 348/169
See application file for complete search history.

(56) References Cited

U.S. PATENT DOCUMENTS

| | | |
|---|---|---|
| 4,885,713 A | 12/1989 | Miller |
| 5,692,063 A | 11/1997 | Lee et al. |

(Continued)

OTHER PUBLICATIONS

"Non-Final Office Action", U.S. Appl. No. 13/725,006, dated Aug. 15, 2014, 5 pages.

(Continued)

*Primary Examiner* — Mikhail Itskovich
(74) *Attorney, Agent, or Firm* — SBMC

(57) ABSTRACT

A robust system and method for estimating camera rotation in image sequences. A rotation-based reconstruction technique is described that is directed to performing reconstruction for image sequences with a zero or near-zero translation component. The technique may estimate only the rotation component of the camera motion in an image sequence, and may also estimate the camera intrinsic parameters if not known. Input to the technique may include an image sequence, and output may include the camera intrinsic parameters and the rotation parameters for all the images in the sequence. By only estimating a rotation component of camera motion, the assumption is made that the camera is not moving throughout the entire sequence. However, the camera is allowed to rotate and zoom arbitrarily. The technique may support both the case where the camera intrinsic parameters are known and the case where the camera intrinsic parameters are not known.

20 Claims, 7 Drawing Sheets

(51) Int. Cl.
   *H04N 5/232*   (2006.01)
   *H04N 17/00*   (2006.01)
   *G06K 9/32*    (2006.01)
   *G06K 9/46*    (2006.01)
   *G06T 5/00*    (2006.01)

(52) U.S. Cl.
   CPC .............. *G06T 2207/30241* (2013.01); *G06T 2207/30244* (2013.01)

(56) References Cited

U.S. PATENT DOCUMENTS

| | | | |
|---|---|---|---|
| 5,748,789 | A | 5/1998 | Lee et al. |
| 5,787,203 | A | 7/1998 | Lee et al. |
| 6,760,488 | B1 | 7/2004 | Moura et al. |
| 6,970,591 | B1* | 11/2005 | Lyons et al. ................. 382/154 |
| 7,177,740 | B1 | 2/2007 | Guangjun et al. |
| 7,356,082 | B1 | 4/2008 | Kuhn |
| 7,477,762 | B2 | 1/2009 | Zhang et al. |
| 8,248,476 | B2 | 8/2012 | Ke et al. |
| 8,259,994 | B1 | 9/2012 | Anguelov et al. |
| 8,437,501 | B1 | 5/2013 | Anguelov et al. |
| 8,693,734 | B2 | 4/2014 | Jin |
| 8,873,846 | B2 | 10/2014 | Jin |
| 8,923,638 | B2 | 12/2014 | Jin |
| 8,934,677 | B2 | 1/2015 | Jin |
| 8,942,422 | B2 | 1/2015 | Jin |
| 9,083,945 | B2 | 7/2015 | Jin |
| 9,131,208 | B2 | 9/2015 | Jin |
| 9,292,937 | B2 | 3/2016 | Jin |
| 9,317,928 | B2 | 4/2016 | Jin |
| 9,390,515 | B2 | 7/2016 | Jin |
| 2003/0103682 | A1 | 6/2003 | Blake et al. |
| 2006/0159308 | A1* | 7/2006 | Hampapur ............ G06T 3/4038 382/103 |
| 2008/0043848 | A1* | 2/2008 | Kuhn ................ G06F 17/30811 375/240.16 |
| 2010/0079598 | A1 | 4/2010 | Ke et al. |
| 2010/0142846 | A1 | 6/2010 | Tolliver et al. |
| 2010/0245593 | A1 | 9/2010 | Kim et al. |
| 2011/0007138 | A1 | 1/2011 | Zhang et al. |
| 2011/0025853 | A1 | 2/2011 | Richardson |
| 2011/0064308 | A1 | 3/2011 | Stein et al. |
| 2011/0311104 | A1 | 12/2011 | Sinha et al. |
| 2013/0044186 | A1 | 2/2013 | Jin et al. |
| 2013/0044913 | A1 | 2/2013 | Jin et al. |
| 2013/0058581 | A1 | 3/2013 | Zhang et al. |
| 2013/0230214 | A1 | 9/2013 | Arth et al. |
| 2013/0265387 | A1 | 10/2013 | Jin |
| 2013/0265443 | A1 | 10/2013 | Jin |
| 2013/0266179 | A1 | 10/2013 | Jin |
| 2013/0266180 | A1 | 10/2013 | Jin |
| 2013/0266218 | A1 | 10/2013 | Jin |
| 2013/0266238 | A1 | 10/2013 | Jin |
| 2015/0030206 | A1 | 1/2015 | Hailin |
| 2015/0249811 | A1 | 9/2015 | Jin |
| 2015/0317802 | A1 | 11/2015 | Jin |

OTHER PUBLICATIONS

"Notice of Allowance", U.S. Appl. No. 13/725,019, dated Jun. 23, 2014, 7 pages.
"Notice of Allowance", U.S. Appl. No. 13/725,006, dated Sep. 2, 2014, 7 pages.
"Corrected Notice of Allowance", U.S. Appl. No. 13/724,973, dated Dec. 24, 2014, 2 pages.
"Final Office Action", U.S. Appl. No. 13/724,906, dated Feb. 23, 2015, 7 pages.
"Supplemental Notice of Allowance", U.S. Appl. No. 13/724,906, dated May 5, 2015, 2 pages.
"Notice of Allowance", U.S. Appl. No. 13/724,906, dated Mar. 11, 2015, 4 pages.
"Notice of Allowance", U.S. Appl. No. 13/724,945, dated Apr. 22, 2015, 6 pages.
"Supplemental Notice of Allowance", U.S. Appl. No. 13/724,871, dated Oct. 14, 2014, 2 pages.
"Supplemental Notice of Allowance", U.S. Appl. No. 13/724,871, dated Nov. 24, 2014, 2 pages.
"Notice of Allowance", U.S. Appl. No. 13/724,871, dated Sep. 18, 2014, 6 pages.
"Notice of Allowance", U.S. Appl. No. 13/724,973, dated Oct. 9, 2014, 7 pages.
"Non-Final Office Action", U.S. Appl. No. 13/724,906, dated Oct. 16, 2014, 8 pages.
"Non-Final Office Action", U.S. Appl. No. 14/514,820, dated Sep. 10, 2015, 6 pages.
"Non-Final Office Action", U.S. Appl. No. 14/801,432, dated Sep. 14, 2015, 6 pages.
"Notice of Allowance", U.S. Appl. No. 14/801,432, dated Nov. 6, 2015, 4 pages.
"Supplemental Notice of Allowance", U.S. Appl. No. 13/724,945, dated Jun. 26, 2015, 2 pages.
"Supplemental Notice of Allowance", U.S. Appl. No. 13/724,945, dated Aug. 5, 2015, 3 pages.
"Supplemental Notice of Allowance", U.S. Appl. No. 14/801,432, dated Feb. 22, 2016, 2 pages.
"Corrected Notice of Allowance", U.S. Appl. No. 14/801,432, dated Dec. 4, 2015, 2 pages.
"Notice of Allowance", U.S. Appl. No. 14/514,820, dated Dec. 14, 2015, 7 pages.
"Supplemental Notice of Allowance", U.S. Appl. No. 14/713,914, dated May 23, 2016, 2 pages.
"Notice of Allowance", U.S. Appl. No. 14/713,914, dated Apr. 13, 2016, 8 pages.
Bruce D. Lucas and Takeo Kanade. An Iterative Image Registration Technique with an Application to Stereo Vision. International Joint Conference on Artificial Intelligence, pp. 674-679, 1981.
Jianbo Shi and Carlo Tomasi. Good Features to Track. IEEE Conference on Computer Vision and Pattern Recognition, pp. 593-600, 1994.
D. Nister. An efficient solution to the five-point relative pose problem. IEEE Transactions on Pattern Analysis and Machine Intelligence 26(6) 756-770, Jun. 2004.
Martin A. Fischler and Robert C. Bolles. Random Sample Consensus: A Paradigm for Model Fitting with Applications to Image Analysis and Automated Cartography. Comm. of the ACM 24 (6) (1981), pp. 381-395.
Richard Hartley and Andrew Zisserman, Multiple View Geometry, CVPR Jun. 1999. pp. 1-240.
Laurent Kneip, Davide Scaramuzza, and Roland Siegwart. A Novel Parameterization of the Perspective-Three-Point Problem for a Direct Computation of Absolute Camera Position and Orientation. In Proc. IEEE Computer Vision and Pattern Recognition, 2011. pp. 1-8.
M. Brown, R. Hartley and D. Nister. Minimal Solutions for Panoramic Stitching. In Proc. International Conference on Computer Vision and Pattern Recognition, Jun. 2007. pp. 1-8.
E. Hemayed, A survey of camera self-calibration. In Proceedings IEEE Conference on Advanced Video and Signal Based Surveillance, 2003. pp. 1-7.
Riccardo Gherardi and Andrea Fusiello, Practical Autocalibration. In Proceedings European Conference on Computer Vision, 2010. pp. 1-12.
M. Pollefeys, R. Koch and L. Van Gool. Self-Calibration and Metric Reconstruction in spite of Varying and Unknown Internal Camera Parameters. International Journal of Computer Vision, 32(1), 1999. pp. 1-18.
Jin, Hailin, Paolo Favaro, and Stefano Soatto. "Real-time feature tracking and outlier rejection with changes in illumination." Computer Vision, 2001. ICCV 2001. Proceedings. Eighth IEEE International Conference on. vol. 1. IEEE, 2001. pp. 1-12.
Tsai, R. Y. and Huang, T.S. Estimating three-dimensional motion parameters of a rigid planar patch, II: singular value decomposition. IEEE Transactions on Acoustics, Speech and Signal Processing, vol. ASSP-30, pp. 525-534, Aug. 1982.

(56) References Cited

OTHER PUBLICATIONS

Weng, J., Ahuja, N., and Huang, T.S. Motion and Structure from Point Correspondences with Error Estimation: Planar Surfaces. IEEE Transactions on Signal Processing, 39(12), 1991, pp. 1-27.
Longuet-Higgins, H.C. The visual ambiguity of a moving plane. Proceedings of the Royal Society of London, 1984, pp. 1-12.
Waxman, A. M. and Wohn, K. Contour evolution, neighborhood deformation and global image flow: Planar surfaces in motion. International Journal of Robotics Research, 4(3), 1985, pp. 1-15.
Richard Szeliski and P. H. S. Torr. Geometrically Constrained Structure from Motion: Points on Planes. European Workshop on 3D Structure from Multiple Images of Large-Scale Environments (SMILE), 1998, pp. 1-23.
Bartoli, A. and Sturm, P. Constrained Structure and Motion From Multiple Uncalibrated Views of a Piecewise Planar Scene. International Journal on Computer Vision, 52(1), 2003, pp. 1-42.
Philip H. S. Torr, Andrew W. Fitzgibbon, and Andrew Zisserman. The problem of degeneracy in structure and motion recovery from uncalibrated image sequences. International Journal of Computer Vision, 32(1), 1999, pp. 1-20.
Marc Pollefeys, Frank Verbiest, and Luc Van Gool. Surviving dominant planes in uncalibrated structure and motion recovery. In Proceedings of European Conference on Computer Vision, 2002, pp. 1-14.
O. Chum, T. Werner, and J. Matas. Two-view geometry estimation unaffected by a dominant plane. In Proceedings of IEEE Conference on Computer Vision and Pattern Recognition, 2005, pp. 1-8.
Robert Kaucic, Nicolas Dano, and Richard Hartley. Plane-based projective reconstruction. In Proceedings of International Conference on Computer Vision, 2001, pp. 1-8.
Carsten Rother. Linear multi-view reconstruction of points, lines, planes and cameras using a reference plane. In Proceedings of International Conference on Computer Vision, 2003, pp. 1-8.
C. Baillard and A. Zisserman. Automatic reconstruction of piecewise planar models from multiple views. In Proceedings of IEEE Conference on Computer Vision and Pattern Recognition, 1999, pp. 1-7.
Friedrich Fraundorfer, Konrad Schindler, and Horst Bischof. Piecewise planar scene reconstruction from sparse correspondences. Image and Vision Computing, 24(4), 2006, pp. 395-406.
Kanazawa, Y. and Kawakami, H. Detection of planar regions with uncalibrated stereo using distributions of feature points. In British Machine Vision Conference (BMVC), Kingston upon Thames, London, Sep. 2004, vol. 1, pp. 247-256.
Piazzi, J. and Prattichizzo, D. Plane Detection with stereo images. In International Conference Robotics and Automation, 2006, pp. 1-6.
Vincent, E. and Laganiere, R. Detecting planar homographies in an image pair. In International Symposium on Image and Signal Processing and Analysis, 2001, pp. 1-6.
Lopez-Nicolas, G., Guerrero, J.J., Pellejero, O.A., and Sagues, C. Computing homographies from three lines or points in an image pair. In ICIAP'05 Proceedings of the 13th international conference on Image Analysis and Processing, pp. 446-453 (2005).
David F. Fouhey, Daniel Scharstein, and Amy J. Briggs. Mulitple plane detection in image pairs using j-linkage. In Proc. 20th International Conference on Pattern Recognition (ICPR 2010), Istanbul, Turkey, Aug. 2010, pp. 1-4.
Manolis I.A. Lourakis, Antonis A. Argyros and Stelios C. Orphanoudakis. Detecting planes in an uncalibrated image pair. In Proc. BMVC'02, vol. 2, 2002, pp. 587-596 (2002).
Johann Prankl, Michael Zillich, Bastian Leibe, and Markus Vincze. Incremental model selection for detection and tracking of planar surfaces. In Proceedings of British Machine Vision Conference, 2010, p. 1.
Benoit Bocquillon, Pierre Gurdjos, and Alain Crouzil. Towards a guaranteed solution to plane-based selfcalibration. In ACCV, pp. 11-20, 2006.
M. Pollefeys, L.J.V. Gool, M. Vergauwen, F. Verbiest, K. Cornelis, J. Tops and R. Koch, "Visual Modeling with a Hand-Held Camera", International Journal of Computer Visioin, vol. 59(3), pp. 207-232, 2004.
P. Gurdjos and P. Sturm. Methods and geometry for plane-based self-calibration. In CVPR, 2003, pp. 1-6.
Y. Ma, J. Kosecka, S. Soatto, and S. Sastry. An Invitation to 3-D Vision, From Images to Models. Springer-Verlag, New York, 2004, pp. 1-338.
Ezio Malis and Roberto Cipolla. Camera self-calibration from unknown planar structures enforcing the multiview constraints between collineations. PAMI, 24(9):1268-1272, 2002.
J. M. Becker, T. Fournel, and C. Mennessier. Plane-based camera self-calibration by metric rectification of images. Image and Vision Computing, 26:913-934, Jul. 2008.
Peter F. Sturm and Stephen J. Maybank. On plane-based camera calibration: A general algorithm, singularities, applications. In CVPR, pp. 432-437, 1999.
Bill Triggs. Autocalibration from planar scenes. In Proceedings of European Conference on Computer Vision (ECCV), 1998, pp. 1-20.
C. Engels, H. Stewenius, and D. Nister, " Bundle adjustment rules," In Photogrammetric Computer Vision (PCV'06), 2006, pp. 1-6.
Bill Triggs, Philip F. McLauchlan, Richard I. Hartley and Andrew W. Fitzgibbon, "Bundle Adjustment—A Modern Synthesis," Proceedings of the International Workshop on Vision Algorithms: Theory and Practice, 1999, pp. 1-71.
Lourakis, M., Argyros, A., "The design and implementation of a generic sparse bundle adjustment software package based on the Levenberg-Marquardt algorithm," Technical Report 340, Institute of Computer Science—FORTH (2004), pp. 1-23.
Zhang, J., Boutin, M., and Aliaga, D., "Robust bundle adjustment for structure from motion," Proceedings of the International Conference on Image Processing (ICIP), 2006, pp. 1-4.
N. Snavely, S. Seitz, and R. Szeliski, "Modeling the world from internet photo collections," International Journal of Computer Vision, vol. 80, No. 2, pp. 189-210, 2008.
U.S. Appl. No. 13/300,277, filed Nov. 11, 2011, Hailin Jin, et al.
U.S. Appl. No. 13/551,603, filed Jul. 17, 2012, Hailin Jin, et al.
U.S. Appl. No. 13/551,601, filed Jul. 17, 2012, Hailin Jin, et al.

* cited by examiner

ROBUST VIDEO-BASED CAMERA ROTATION ESTIMATION

PRIORITY INFORMATION

This application claims benefit of priority of U.S. Provisional Application Ser. No. 61/621,365 entitled "Structure from Motion Methods and Apparatus" filed Apr. 6, 2012, the content of which is incorporated by reference herein in its entirety.

BACKGROUND

Description of the Related Art

In computer vision, inferring rigid-body motions of a camera from a video or set of images is a problem known as Structure from Motion (SFM). In SFM, a task or goal is to estimate the camera motion from a set of point correspondences in a set of images or video frames. Obtaining Structure from Motion (SFM) algorithms is of importance because a successful SFM algorithm would enable a wide range of applications in different domains including 3D image-based modeling and rendering, video stabilization, panorama stitching, video augmentation, vision based robot navigation, human-computer interaction, etc.

SUMMARY

Various embodiments of Structure from Motion (SFM) techniques and algorithms are described that may be applied, for example, to find the three-dimensional (3D) structures of a scene, for example from a video taken by a moving video camera or from a set of images taken with a still camera, as well as systems that implement these algorithms and techniques. In SFM, a task or goal is to estimate the camera motion (which may, but does not necessarily, have both translation and rotation components) from a set of point correspondences in a set of images or video frames. In addition, in at least some cases, intrinsic camera parameters (e.g., focal length) may also be estimated if not known. Performing the task of estimating camera motion and intrinsic parameters for a frame or a sequence of frames may be referred to as reconstruction. Thus, a reconstruction algorithm or technique (which may also be referred to as an SFM technique) may be implemented and applied to estimate the camera motion and intrinsic parameters for image sequences.

Embodiments of a robust system for estimating camera rotation in image sequences (e.g., video sequences) are described. Embodiments of a rotation-based reconstruction technique, which may also be referred to as a rotation-based SFM technique, are described that are generally directed to performing reconstruction for image sequences with a zero or near-zero translation component. The rotation-based SFM technique may estimate only the rotation component of the camera motion in an image sequence, and may also estimate the camera intrinsic parameters (e.g., focal length) if not known. Input to the rotation-based SFM technique may include an image sequence, and output may include the camera intrinsic parameters (e.g., focal length) and the rotation parameters for all the images in the sequence. By only estimating a rotation component of camera motion, the assumption is made that the camera is not moving throughout the entire sequence. However, the camera is allowed to rotate and zoom arbitrarily. At least some embodiments of the rotation-based SFM technique may support both the case where the camera intrinsic parameters are known (e.g., via user input or metadata) and the case where the camera intrinsic parameters are not known. The first case may be referred to as the calibrated case, and the second case may be referred to as the uncalibrated case.

At least some embodiments of the rotation-based SFM technique may implement an adaptive reconstruction algorithm that starts by adaptively determining and reconstructing an initial set of keyframes that covers only a part of an image sequence (e.g., a set of spaced frames somewhere in the middle of the sequence), and that incrementally and adaptively determines and reconstructs additional keyframes to fully cover the image sequence. The rest of the frames in the sequence may then be reconstructed based on the determined and reconstructed keyframes.

Figure 1:
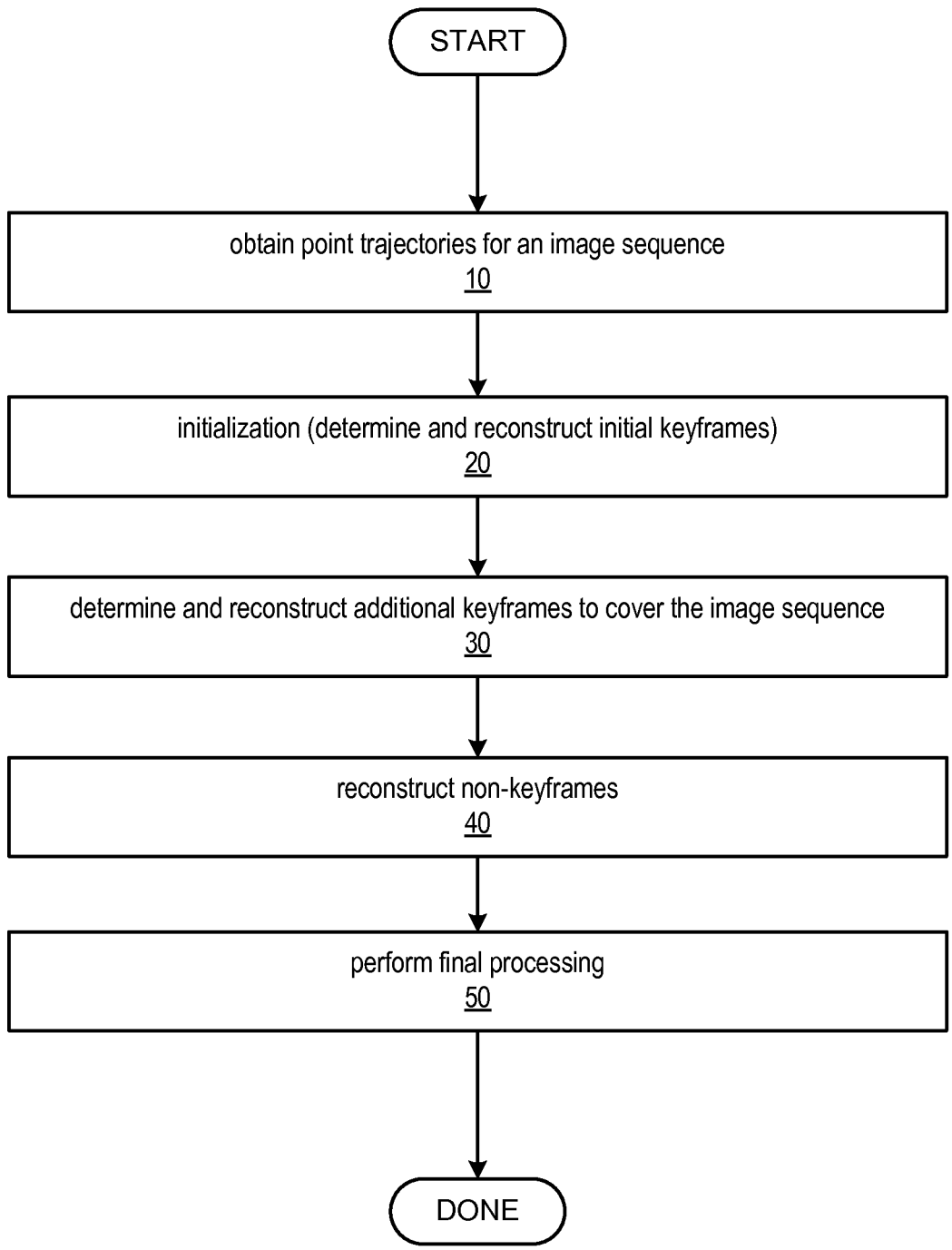
FIG. 1 is a high-level flowchart of a general adaptive reconstruction algorithm, according to at least some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of Structure from Motion (SFM) techniques and algorithms are described that may be applied, for example, to find the three-dimensional (3D) structures of a scene, for example from a video taken by a moving video camera or from a set of images taken with a still camera. Systems that may implement these algorithms and techniques are also described. In SFM, a task or goal is to estimate the camera motion (which may, but does not necessarily, have both translation and rotation components) from a set of point correspondences in a set of images or video frames. In addition, in at least some cases, intrinsic camera parameters (e.g., focal length) may also be estimated if not known. Performing the task of estimating camera motion and intrinsic parameters for a frame or a sequence of frames may be referred to as reconstruction. Thus, a reconstruction algorithm or technique (which may also be referred to as an SFM technique) may be implemented and applied to estimate the camera motion and intrinsic parameters for image sequences. Note that a distinct camera may be assumed for each image or frame in an image sequence. Thus, each frame or image in a sequence may be referred to as a "camera."

Embodiments of a rotation-based reconstruction technique, which may also be referred to as a rotation-based SFM technique, are described that are directed to performing reconstruction for image sequences in which the translation component of the camera motion is zero or near zero. The rotation-based SFM technique may estimate only the rotation component of the camera motion in an image sequence, and may also estimate the camera intrinsic parameters (e.g., focal length) if not known.

Embodiments of the rotation-based reconstruction technique may implement embodiments of an adaptive reconstruction algorithm that starts by adaptively determining and reconstructing an initial set of keyframes that covers only a part of an image sequence (e.g., a set of spaced frames somewhere in the middle of the sequence), and that incrementally and adaptively determines and reconstructs additional keyframes to fully cover the image sequence. The rest of the frames in the sequence may then be reconstructed based on the determined and reconstructed keyframes.

At least some embodiments of the adaptive reconstruction algorithm may be configured to handle both cases where the intrinsic camera parameters (e.g., focal length) are known (e.g., via user input or via metadata provided with the input image sequence) and cases where the intrinsic camera parameters are not known. The first case may be referred to herein as the calibrated case, and the second case may be referred to herein as the uncalibrated case. In at least some embodiments, in the calibrated case, a Euclidian (or metric) reconstruction technique may be applied. In at least some embodiments, in the uncalibrated case, a projective reconstruction technique may at least initially be applied. A self-calibration technique is described that may, for example be applied to produce a Euclidian (or metric) reconstruction in the uncalibrated case.

In addition, at least some embodiments of the adaptive reconstruction algorithm may be configured to handle image sequences with either constant (fixed) focal length or varying focal length (e.g., resulting from zooming of the camera lens), in both the calibrated and uncalibrated cases.

FIG. 1 is a high-level flowchart of an adaptive reconstruction algorithm, according to at least some embodiments. As indicated at 10, point trajectories (which may also be referred to as feature trajectories) for an image sequence (e.g., a video sequence, or a set of still photographs) may be obtained. Each point trajectory tracks a feature across two or more of the images in the sequence. As indicated at 20, an initialization technique may be performed to determine and reconstruct a set of initial keyframes covering a portion of the image sequence according to the point trajectories. As indicated at 30, an adaptive technique may then be performed to iteratively select and reconstruct additional keyframes to cover the image sequence. As indicated at 40, non-keyframes (e.g., all frames that have not yet been included in the reconstruction) may be reconstructed. As indicated at 50, final processing may be performed. Output of the algorithm includes at least the camera intrinsic parameters and the Euclidean motion parameters (or the rotation component of the camera motion in the rotation-based reconstruction technique) for the images in the sequence. Each of elements 10 through 50 is discussed in more detail below.

At least some embodiments of the rotation-based reconstruction technique may implement embodiments of feature tracking techniques that may be used to establish point trajectories over time in an input image sequence. The point trajectories may then, for example, be used as input to embodiments of the adaptive reconstruction algorithm in embodiments of the rotation-based reconstruction technique. However, note that embodiments of the feature tracking techniques may be used in or with any method or technique that may be applied to image sequences and that requires point trajectories. For example, embodiments of the feature tracking techniques may be used to generate point trajectories in embodiments of a plane-based reconstruction technique or a general 3D reconstruction technique.

At least some embodiments of the rotation-based reconstruction technique may implement embodiments of an initialization technique that may, for example, be used in the adaptive reconstruction algorithm described above. In the initialization technique, two initial keyframes are selected from a set of temporally spaced keyframe candidates, the two initial keyframes are reconstructed, and then one or more additional keyframes between the two initial keyframes are selected and reconstructed.

At least some embodiments of the rotation-based reconstruction technique may implement embodiments of an adaptive technique for iteratively selecting and reconstructing additional keyframes to fully cover the image sequence; the technique may, for example, be used in the adaptive reconstruction algorithm described above. In this adaptive technique, in the uncalibrated case, a projective reconstruction technique may at least initially be applied, and a self-calibration technique may be applied to generate a Euclidian reconstruction.

While not shown in FIG. 1, in some embodiments of an adaptive reconstruction algorithm, a technique for selecting and reconstructing optimizing keyframes (which may be referred to as opt-keyframes) between the keyframes already in a reconstruction may be used to provide a better reconstruction. The technique may, for example, be used in the adaptive reconstruction algorithm described above in reference to FIG. 1. This technique may add and reconstruct frames to the set of keyframes already generated by the initialization technique and the adaptive technique for iteratively selecting and reconstructing additional keyframes. In addition, in some embodiments, the technique may determine and remove outlier points from the projection, and determine and recover inlier points in the projection. Adding the opt-keyframes and inlier points may result in additional, and possibly shorter, point trajectories being included in the reconstruction, thus providing a better reconstruction that may be more suited for later operations that may be applied to the image sequence, such as plane fitting.

In at least some embodiments of the adaptive reconstruction algorithm, in a final processing stage, to avoid including non-contiguous frames or cameras in the reconstruction, a largest contiguous subset of the frames may be determined. Frames that are not in this subset may be removed from the reconstruction. In addition, point trajectories that do not appear in this largest contiguous subset may be removed from the reconstruction. In some embodiments, a global optimization of the reconstruction may be performed in the final processing stage after the non-contiguous frames and point trajectories have been removed.

Rotation-Based Reconstruction Technique
Introduction

Embodiments of a robust system for estimating camera rotation in image sequences (e.g., video sequences) are described. Embodiments of a rotation-based reconstruction technique, which may also be referred to as a rotation-based SFM technique, are described that are generally directed to performing reconstruction for image sequences with a zero or near-zero translation component. The rotation-based SFM technique may estimate only the rotation component of the camera motion in an image sequence, and may also estimate the camera intrinsic parameters (e.g., focal length) if not known. Input to the rotation-based SFM technique may include an image sequence, and output may include the camera intrinsic parameters (e.g., focal length) and the rotation parameters for all the images in the sequence. By only estimating a rotation component of camera motion, the assumption is made that the camera is not moving throughout the entire sequence. However, the camera is allowed to rotate and zoom arbitrarily.

Camera Intrinsic Parameters

Embodiments of the rotation-based SFM technique may support both the case where the camera intrinsic parameters are known (e.g., via user input or metadata) and the case where the camera intrinsic parameters are not known. The first case may be referred to herein as the calibrated case, and the second case may be referred to herein as the uncalibrated case.

In at least some embodiments of the rotation-based SFM technique, in the case where the intrinsic parameters are not known (the uncalibrated case), one or more of the following assumptions may be made:

the principal point of each image is known, as is the pixel aspect ratio. Note that the principal point may be allowed to change over time;

there is no pixel skew. The only potential unknown intrinsic parameter is the focal length; and information on whether or not the focal length changes in the sequence is available.

From the above, in at least some embodiments of the rotation-based SFM technique, three different cases may be supported:

calibrated; all the intrinsic parameters are known;
uncalibrated, with a constant focal length; and
uncalibrated, with a varying focal length.

At least some embodiments of the rotation-based SFM technique may implement an incremental approach to generating a reconstruction from an input image sequence. In particular, at least some embodiments of the rotation-based SFM technique may start from an initial subset of frames and add one or more frames at a time until the entire image sequence is processed.

As an alternative to the incremental approach that processes all the frames in an image sequence, embodiments of the rotation-based SFM technique may be applied to sub-sequences of frames in a divide-and-conquer approach. A divide-and-conquer approach divides the image sequence into sub-sequences, solves the sub-sequences, and recursively merges the sub-sequences to obtain a final result.

In at least some embodiments, high-level components of the rotation-based SFM technique may include a feature tracking component, an initialization component that adaptively determines and reconstructs an initial set of keyframes that covers only a part of an image sequence (e.g., a set of spaced frames somewhere in the middle of the sequence), a keyframe reconstruction component that incrementally and adaptively determines and reconstructs additional keyframes to fully cover the image sequence, a non-keyframe reconstruction component that reconstructs any remaining frames in the image sequence, and a final processing component.

Figure 2:
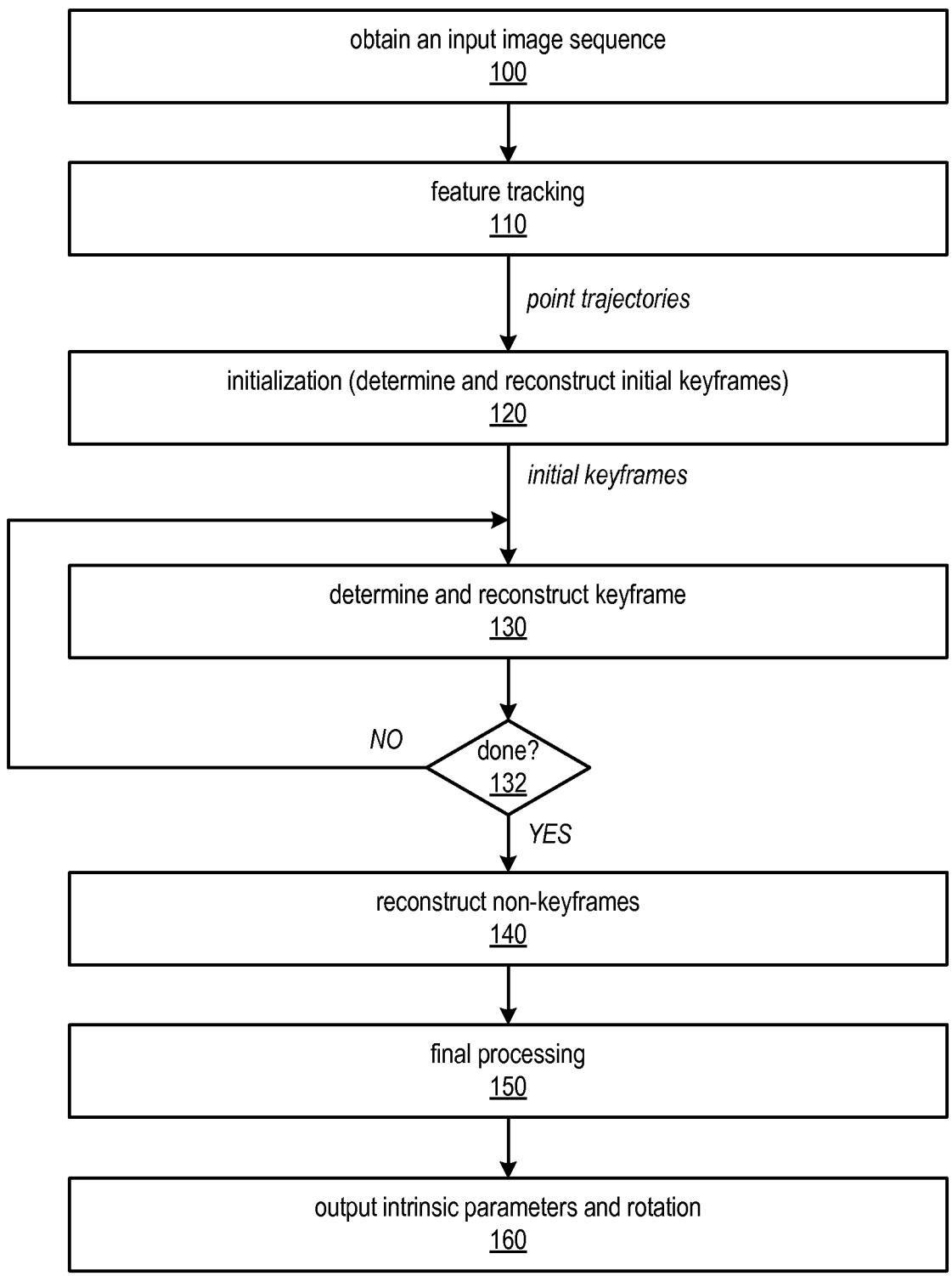
FIG. 2 is a high-level flowchart of a rotation-based Structure from Motion (SFM) technique, according to at least some embodiments.

FIG. 2 is a high-level flowchart of the rotation-based SFM technique, according to at least some embodiments. Note that the rotation-based SFM technique as illustrated in FIG. 2 implements an embodiment of the general adaptive reconstruction algorithm as illustrated in FIG. 1, with some changes.

As indicated at 100, an input image sequence may be obtained. The image sequence may, for example, be a video taken by a video camera or a set of images taken with a still camera. As indicated at 110, a feature tracking technique may be applied to establish point trajectories over time in the input image sequence. Embodiments of a feature tracking technique that may be used in at least some embodiments are described in this document. Output of the feature tracking technique is a set of point trajectories. As indicated at 120, an initialization technique may be performed to determine and reconstruct a set of initial keyframes covering a portion of the image sequence according to the point trajectories. Input to the initialization technique includes at least the set of point trajectories. Output of the initialization technique is a set of initial keyframes and the initial reconstruction.

Elements 130 and 132 are a keyframe reconstruction loop that incrementally and adaptively determines and reconstructs additional keyframes to fully cover the image sequence. As indicated at 130, a new keyframe is determined and reconstructed. At 132, if there are more keyframes to be reconstructed, then the method returns to 130 to add a next keyframe. Otherwise, the method goes to element 140.

As indicated at 140, non-keyframes (keyframes that have not yet been included in the reconstruction) may be reconstructed. As indicated at 150, final processing may be performed. As indicated at 160, at least the camera intrinsic parameters and the rotation component for the images in the input image sequence may be output.

The elements of the rotation-based SFM technique shown in FIG. 2 are discussed in more detail below.

Feature Tracking

As indicated at 110 of FIG. 2, given an input image sequence, embodiments of the rotation-based SFM technique may first perform feature tracking to establish point trajectories over time. A basic idea of feature tracking is to find the locations of the same point in subsequent video frames. In general, a point should be tracked as long and as accurately as possible, and as many points as possible should be tracked.

In at least some embodiments, the rotation-based SFM technique may use an implementation of the Lucas-Kanade-Tomasi algorithm to perform feature tracking In these embodiments, for every point at time t, a translational model may be used to track against the previous video frame (at time t−1), and an affine model may be used to track against the reference video frame at time $t_0$ ($t_0$ may vary according to the point). The result of feature tracking is a set of point trajectories. Each trajectory includes the 2D locations of the "same" point in a contiguous set of frames. Let $x_{i,j}$ denote the 2D location of the i-th point in the j-th image. Since not all of the points are present in all of the images, $x_{i,j}$ is undefined for some combinations of i and j. To simplify the notation, a binary characteristic function, $\psi_{i,j}:\psi_{i,j}=1$, may be used if the i-th point is present on the j-th image; otherwise, $\psi_{i,j}=0$. Through $\psi_{i,j}$, quantities such as $\psi_{i,j}x_{i,j}$ may be used even if $x_{i,j}$ is undefined.

Note that different feature tracking algorithms and/or different matching paradigms, such as detecting and matching robust image features, may be used in some embodiments. The rotation-based SFM technique can work with any feature tracking technique that computes point trajectories.

Figure 3:
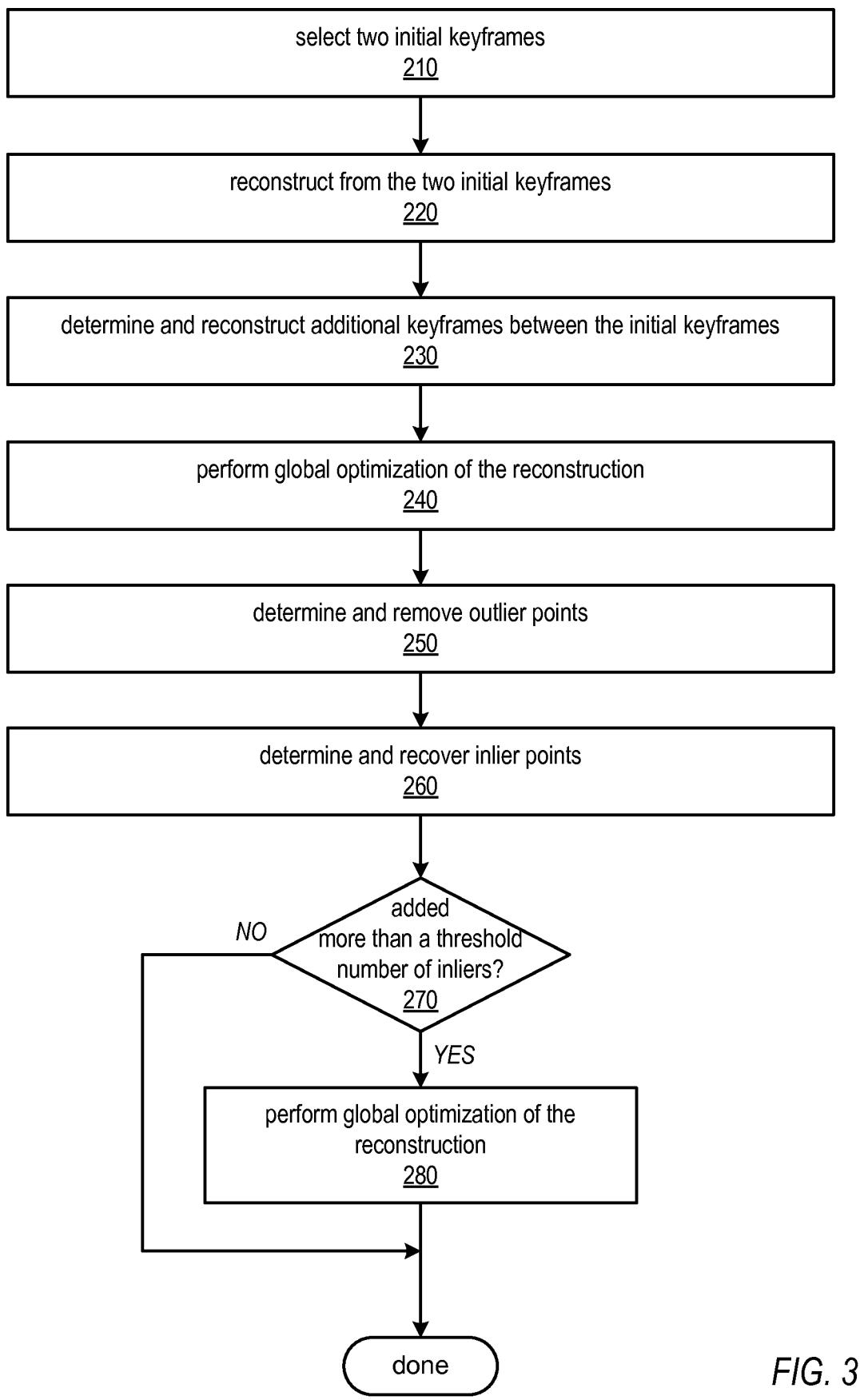
FIG. 3 is a flowchart of an initialization technique that may be used in a general adaptive reconstruction algorithm, for example as implemented by a rotation-based SFM technique, according to at least some embodiments.

In at least some embodiments, the point trajectories are input to the rest of the rotation-based SFM technique; the input image sequence may not be referenced after feature tracking Rotation-Based Reconstruction Technique—Initialization Technique As indicated at 120 of FIG. 2, an initialization technique may be performed to determine and reconstruct a set of initial keyframes covering a portion of the image sequence according to the point trajectories. Refer to FIG. 3 and the discussion thereof for a flowchart of an initialization technique that may be used in at least some embodiments of the rotation-based SFM technique. A goal of the initialization technique is to compute an initial reconstruction from a subset of frames in the image sequence. The quality of the initialization is very important. To obtain this quality, two initial frames that have a sufficient number of well-distributed points and that have sufficiently large relative rotation may need to be determined. The following sections first describe a method for selecting the two initial frames, according to at least some embodiments, and then describe a method for performing the initial reconstruction, according to at least some embodiments.

The elements of the initialization technique shown in FIG. 3 in regards to the rotation-based SFM technique are discussed in more detail below.

Keyframe Selection

In at least some embodiments, the initialization technique may select a set of candidate frames from the image sequence in which the technique searches for the two best frames to use as initial frames. This set of candidate frames may be referred to as keyframes. In at least some embodiments, a keyframe selection algorithm may select a set of evenly spaced keyframes, for example one keyframe every half second or one keyframe every 15 frames, starting from the first frame of the image sequence. In at least some embodiments, video frame rate information, if available, may be used in determining which frames to select. For example, if the video frame rate is 30 frames per second, and the algorithm wants to sample at one frame every half-second, then the algorithm may select every $15^{th}$ frame as a keyframe. In at least some embodiments, if frame rate information is not available, the keyframe selection algorithm may assume the video is taken at 30 frames per second, or at some other rate. In at least some embodiments, if the last frame in the video sequence is not in the keyframe set, the frame is added as a keyframe. In at least some embodiments, output of the keyframe selection algorithm may be a set of evenly spaced keyframes, e.g. every $15^{th}$ frame from the image sequence, which includes the first and last frames in the image sequence. Note, however, that the next-to-last and last keyframe may be closer than other pairs of keyframes in the set, since the last keyframe may have been added in the last step.

Note that the keyframe selection algorithm described above is given as an example and is not intended to be limiting. Other techniques may be used to select a set of keyframes in some embodiments.

Candidate Initial Pairs

In at least some embodiments, the initialization technique may select a set of candidate initial pairs from the keyframes. In at least some embodiments, a candidate initial pairs selection algorithm may first select all the adjacent-2 keyframe pairs. An adjacent-k keyframe pair may be defined as a pair of keyframes that are two keyframes apart from each other. The algorithm may then densely sample a first subset of the image sequence. In at least some embodiments, the size of this subset may be computed as follows: if the total number of keyframes is less than 8, all the keyframes are included; if the total number of keyframes is less than 16, half of the keyframes may be included; otherwise, one third of the keyframes may be included.

In at least some embodiments, the scores for all possible pairs of keyframes within the subset may be computed.

Score Computation

In at least some embodiments, for each candidate initial pair, two quantities: s and e may be computed as follows. All of the points that overlap the two frames in the candidate pair are collected. A tentative reconstruction is performed, for example using the algorithm described in the section titled Initial pair reconstruction. In at least some embodiments, s is set to be the number of inlier points. In at least some embodiments, for each point, a fitting residual is computed against the identity transformation as follows: Let $r_0$ and $r_1$ be the indices of the candidate initial pair:

$$\|x_{i,r_0} + K_{r_0} x_i\|^2 + \|x_{i,r_1} - K_{r_1} x_i\|^2 \tag{D1}$$

where $x_i$, $i=1, 2, \ldots, N$ is the optimal point for the following cost function:

$$\operatorname*{argmin}_{x_i, R} \sum_{i=1}^{N} \psi_{i,r_0} \psi_{i,r_1} (\|x_{i,r_0} - K_{r_0} x_i\|^2 + \|x_{i,r_1} - K_{r_1} R x_i\|^2) \tag{D2}$$

In at least some embodiments, the residuals are sorted, and e is set to the residual value at 80% of the number of points.

Initial Pair Selection

At this point, a score has been computed for each candidate pair, and a best initial pair may be selected, for example as follows In at least some embodiments, among all the candidate pairs, the pairs are found whose e scores are larger than a threshold $S_1$ (which may be computed based on video dimension). From these pairs, the pair with the largest number of point correspondences may be chosen. In the case of a tie in terms of the number of correspondences, a pair with the largest time span may be chosen from the tied pairs.

In at least some embodiments, if the previous step fails, e.g. if all the candidate pairs have e scores lower than the threshold $S_1$, the candidate pairs that are more than $S_2$ number of frames apart and whose numbers of point correspondences are larger than a threshold $S_3$ are found. From these pairs, the pair with the largest number of correspondences may be chosen.

In at least some embodiments, if the previous step fails, the candidate pairs may be sorted according to the product of s and e. The best pair may be compared to the second best pair, for example as follows. Let $s_1$ and $e_1$ be the quantities computed for the best pair and $s_2$ and $e_2$ be the quantities computed for the second best pair. If $s_2 e_2$ is larger than $S_5 s_1 e_1$ and the best pair is a subset of the second best pair in time, the second pair may be used. Otherwise, the best pair is used.

Note that the initial pair selection algorithm described above is given as an example and is not intended to be limiting. Other techniques may be used to select a pair of initial keyframes in some embodiments.

Initial Pair Reconstruction

An initial reconstruction may be computed from two given images. These two images may, for example, be the best initial pair selected in the section titled Initial pair selection or a candidate pair considered in the section titled Score computation. Let $r_0$ and $r_1$ be the indices of the two images. All of the point trajectories that overlap both images are found. In at least some embodiments, the algorithm is different according to the camera intrinsic parameters.

Initial Pair Reconstruction, Calibrated Case

In the calibrated case, the camera intrinsic parameters are known. In at least some embodiments, a 2-point based RANSAC algorithm may be used to compute the initial relative rotation between the two images. The algorithm returns the relative rotation from $r_0$ to $r_1$ along with a set of points that are consistent with the rotation.

In at least some embodiments, the reconstruction may be further refined with a nonlinear optimization. In at least some embodiments, the nonlinear optimization refines the following cost function:

$$\operatorname*{argmin}_{x_i, R} \sum_{i=1}^{N} \psi_{i,r_0} \psi_{i,r_1} (\|x_{i,r_0} - \pi(K_{r_0} x_i)\|^2 + \psi_{i,j} \|x_{i,r_1} - \pi(K_{r_1} R x_i)\|^2) \tag{D3}$$

In at least some embodiments, the nonlinear optimization problem may be solved according to a nonlinear optimization technique, for example as described in the section titled Bundle adjustment technique. The nonlinear optimization obtains a better estimate for the relative rotation R and 2D points $x_i$. However, this estimate only uses inlier points estimated the previous RANSAC step. In at least some embodiments, the estimates may be improved by re-computing the inlier points and again performing the nonlinear optimization. At least some embodiments may iterate between the nonlinear optimization and computing inlier points until a convergence test is met, or until some other terminating condition is met.

In at least some embodiments, the rotation of the first camera ($r_0$) may then be set to the identity transformation, I, and that of the second camera ($r_1$) to R. In at least some embodiments, $r_0$ and $r_1$ may be retained, as they may be used in later optimizations.

Initial Pair Reconstruction, Uncalibrated Case

In the uncalibrated case, the camera focal length is not known and thus needs to be estimated. In the case of constant focal length, in at least some embodiments, a 2-point based RANSAC algorithm may be used to compute the initial relative rotation between the two images. In the case of constant focal length, in at least some embodiments, a 3-point based RANSAC algorithm may be used to compute the initial relative rotation between the two images. Both RANSAC algorithms return the focal lengths and the relative rotation from $r_0$ to $r_1$ along with a set of points that are consistent with the rotation.

In at least some embodiments, the reconstruction may be further refined with a nonlinear optimization. In at least some embodiments, the nonlinear optimization refines the following cost functions depending on whether the focal length is constant or not:

$$\operatorname*{arg\,min}_{x_i, R, f} \sum_{i=1}^{N} \psi_{i,r_0} \psi_{i,r_1} \left( \left\| \begin{array}{c} x_{i,r_0} - \\ \pi(K_{r_0}(f) x_i) \end{array} \right\|^2 + \psi_{i,j} \left\| \begin{array}{c} x_{i,r_1} - \\ \pi(K_{r_1}(f) R x_i) \end{array} \right\|^2 \right) \tag{D4}$$

$$\operatorname*{arg\,min}_{x_i, R, f_{r_0}, f_{r_1}} \sum_{i=1}^{N} \psi_{i,r_0} \psi_{i,r_1} \left( \left\| \begin{array}{c} x_{i,r_0} - \\ \pi(K_{r_0}(f_{r_0}) x_i) \end{array} \right\|^2 + \psi_{i,j} \left\| \begin{array}{c} x_{i,r_1} - \\ \pi(K_{r_1}(f_{r_1}) R x_i) \end{array} \right\|^2 \right) \tag{D5}$$

In at least some embodiments, the nonlinear optimization problem may be solved according to a nonlinear optimization technique, for example as described in the section titled Bundle adjustment technique. The nonlinear optimization obtains a better estimate for the focal lengths and the relative rotation R, and 2D points $x_i$. However, this estimate only uses inlier points estimated the previous RANSAC step. In at least some embodiments, the estimates may be improved by re-computing the inlier points and again performing the nonlinear optimization. At least some embodiments may iterate between the nonlinear optimization and computing inlier points until a convergence test is met, or until some other terminating condition is met.

In at least some embodiments, all of the points that overlap the two initial frames but that are not found to be inlier points may be collected into a set referred to as outlier points. This may be done in both the calibrated and uncalibrated cases.

Reconstruction Between the Initial Pair

In at least some embodiments, the initial reconstruction may be enlarged by incorporating one or more frames between the initial pair. In at least some embodiments, for efficiency, only the keyframes that were selected in the section titled Keyframe selection and that lie between the two frames in the initial pair are considered.

Let $X_i \in \square^3$, $i=1, 2, \ldots, N$ be the inlier points in the initial reconstruction. Let r be the index of the keyframe of interest. In at least some embodiments, in the case of calibrated cameras and uncalibrated cameras with a constant focal length, a 2-point based RANSAC algorithm may be used to compute an initial rotation. In at least some embodiments, in the case of uncalibrated cameras with a varying focal length, a 2-point based RANSAC algorithm may be used to compute an initial rotation and a focal length. The estimates may then be refined using a nonlinear optimization technique. In at least some embodiments, the cost functions are:

$$\operatorname*{argmin}_{R_r} \sum_{i=1}^{N} \psi_{i,r} \|x_{i,r} - \pi(K_r R_r x_i)\|^2 \tag{D6}$$

$$\operatorname*{argmin}_{R_r, f_r} \sum_{i=1}^{N} \psi_{i,r} \|x_{i,r} - \pi(K_r(f)R_r x_i)\|^2 \tag{D7}$$

Initialization Refinement

At this point, a set of keyframes in the reconstruction, along with a set of points that are consistent with the motion parameters (both calibrated and uncalibrated), have been computed. However, the motion parameters and the points have not been optimized. In initialization refinement, the motion parameters and the points may be optimized together to obtain a better reconstruction. In at least some embodiments, a multi-view bundle adjustment may be performed with all the cameras and all the points (see details in the section titled Optimization using multi-view bundle adjustment). After the bundle adjustment, points whose reprojection errors are too large may be removed (see details in the section titled Outlier removal); these points are moved from the inlier set to the outlier set. The points in the outlier set may then be examined to find points that are consistent with the motion parameters (see details in the section titled Inlier recovery); these points are moved from the outlier set to the inlier set. In at least some embodiments, if the number of the newly added inliers exceeds a certain threshold, for example computed as a ratio of the number of the original points, an additional multi-view bundle adjustment may be performed (see details in the section titled Optimization using multi-view bundle adjustment).

Optimization Using Multi-View Bundle Adjustment

In at least some embodiments, at various points within the rotation-based SFM technique, the parameters of a current reconstruction may be optimized. An optimization technique that may be used in at least some embodiments is described in the section titled Bundle adjustment technique. In at least some embodiments, there are three different multi-view bundle cases for the rotation-based SFM technique: calibrated, uncalibrated (constant focal length) and uncalibrated (varying focal length). An example cost function that may be used in the bundle adjustment technique for each of these cases is described below.

Multi-View Bundle Adjustment Cost Functions

This section describes the cost function for each bundle adjustment case of the rotation-base SFM technique. In all the cases, points may be represented as a vector in $\square^2$. It may be assumed that there are M cameras in the current reconstruction. To simplify the notation, it may be assumed that the camera indices are 1 to M. In at least some embodiments, the following cost may be optimized in the case of calibrated cameras:

$$\operatorname*{argmin}_{x_i, R_j} \sum_{i=1}^{N} \sum_{j=1}^{M} \psi_{i,j} \|x_{i,j} - \pi(K_j R_j x_i)\|^2 \tag{D8}$$

In at least some embodiments, the following cost may be optimized in the case of uncalibrated cameras with a constant focal length:

$$\arg\min_{x_i, f, R_j} \sum_{i=1}^{N} \sum_{j=1}^{M} \psi_{i,j} \|x_{i,j} - \pi(K_j(f) R_j x_i)\|^2 \tag{D9}$$

In at least some embodiments, the following cost may be optimized in the case of uncalibrated cameras with varying focal lengths:

$$\arg\min_{x_i, f_j, R_j} \sum_{i=1}^{N} \sum_{j=1}^{M} \psi_{i,j} \|x_{i,j} - \pi(K_j(f_j) R_j x_i)\|^2 \tag{D10}$$

In at least some embodiments, in order to fix the ambiguity, the (reference—0) camera may be fixed to the identity rotation matrix.

Optimization

In at least some embodiments, a bundle adjustment technique that may detect and remove poorly conditioned points during bundle adjustment, for example as described in the section titled Bundle adjustment technique, may be used in all the cases. In at least some embodiments, the detected poorly conditioned points may be removed from the reconstruction and placed in the outlier set.

Outlier Removal

In at least some embodiments, a current reconstruction may be improved by removing points that have relatively large reprojection errors in one or more cameras. In at least some embodiments, for each point in the inlier set, all the cameras on which this point is visible are found, and the reprojection error at each of these cameras is computed. In at least some embodiments, the reprojection error is defined as:

$$\|x_{i,j} - \pi(K_j R_j x_i)\|^2 \tag{D11}$$

In at least some embodiments, all the points whose reprojection error is larger than a threshold on any camera may be collected. These points are removed from the inlier set and placed into to the outlier set.

Inlier Recovery

In at least some embodiments, good points may be recovered from the outlier set of a current reconstruction. In at least some embodiments, for each point in the outlier set, all the cameras on which this point is visible are found, and the optimal coordinates are computed, assuming the cameras are fixed. In at least some embodiments, the optimal coordinates may be computed by optimizing the accumulative reprojection error in the all the visible cameras. In at least some embodiments, the following cost may be optimized:

$$\underset{x_i}{\operatorname{argmin}} \sum_{j=1}^{M} \psi_{i,j} \|x_{i,j} - \pi(K_j R_j x_i)\|^2 \quad \text{(D12)}$$

In at least some embodiments, after the optimal coordinates are obtained, the reprojection error may again be computed for each camera. If all the errors are below a threshold, the point may be moved from the outlier set to the inlier set.

Keyframe Reconstruction Loop

As indicated at 130 and 132 of FIG. 2, additional keyframes may be determined and reconstructed to cover the image sequence. In at least some embodiments of the rotation-based SFM technique, a keyframe reconstruction loop may be used to enlarge the initial reconstruction to cover the entire image sequence. The keyframe reconstruction loop may add keyframes in an incremental and adaptive fashion, adding one keyframe at a time until the entire video sequence is covered. Note that this loop does not add all the frames in the input image sequence. Instead, an adaptive algorithm is used to select particular frame to add. In at least some embodiments, the additional keyframes may be selected from the set of keyframes that were previously selected (see section D3.1). In at least some embodiments, the initial reconstruction may cover a portion of the image sequence, and the additional keyframes may be added one at a time at each end of the current reconstruction, working outwards and alternating between ends.

Adaptive Keyframe Selection

Figure 4:
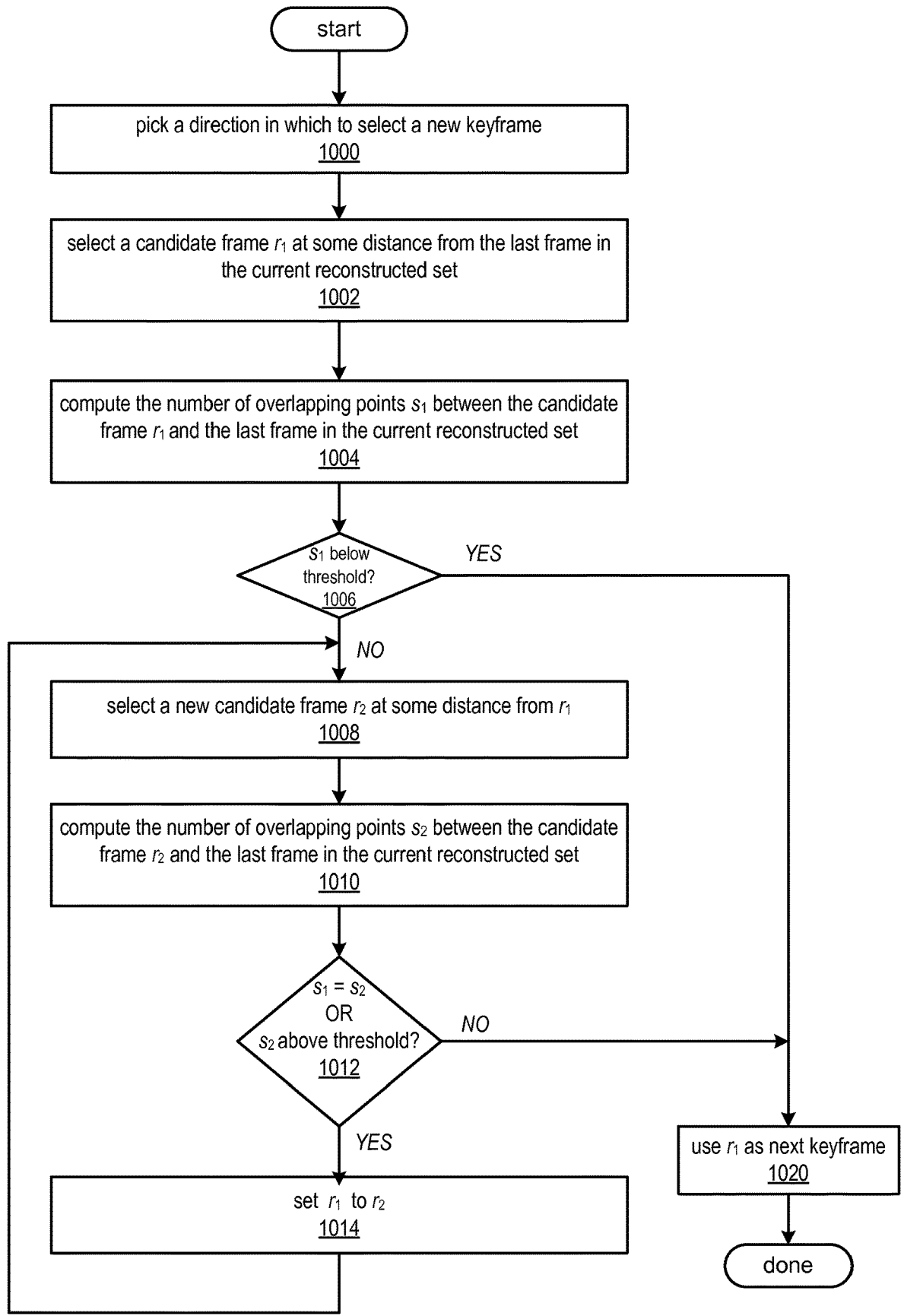
FIG. 4 is a flowchart of a method for selecting a next keyframe, according to at least some embodiments.

In at least some embodiments, a next keyframe may be selected in either of two directions: before and after the current reconstructed set of keyframes. At least some embodiments may alternate between the two directions. Without loss of generality, a method for selecting the next keyframe after the current reconstructed set is described; a method for selecting the next keyframe before the current reconstructed set would be similar. FIG. 4 is a flowchart of a method for selecting a next keyframe, according to at least some embodiments. "Before" and "after" in this context may refer to temporally before and temporally after the current reconstructed set.

As indicated at 1000, a direction is picked in which to select a new keyframe. In at least some embodiments, the method may start in either direction, and may then alternate between the before and after directions. Without loss of generality, the following assumes the direction picked is after the current reconstructed set.

As indicated at 1002, a candidate frame is selected that is some temporal distance (e.g., a half second) or some distance in frames (e.g., 15 frames) after the last frame in the current reconstructed set. Let the index of this frame be $r_1$. If $r_1$ is beyond the end of the image sequence, $r_1$ may be set to the last frame in the sequence if not already computed. In at least some embodiments, if the last frame is already computed, the method may quit, or alternatively may continue to process frames in the other direction until done.

As indicated at 1004, the number of overlapping points between the candidate frame $r_1$ and the last frame in the current reconstructed set is computed. Let this number be $s_1$. At 1006, if $s_1$ is below a threshold, the search is stopped and $r_1$ is used as the next keyframe, as indicated at 1020.

If $r_1$ is not selected at 1006, then as indicated at 1008, a new candidate frame is computed that is some temporal distance (e.g., a half second) or some distance in frames (e.g., 15 frames) out from $r_1$. Let the index of the new candidate frame be $r_2$. As indicated at 1010, the number of overlapping points between the new candidate frame and the last frame in the reconstructed set is computed. Let the number be $s_2$.

At 1012, if $s_1 = s_2$ or if $s_2$ is above a threshold, $r_1$ is set to $r_2$ and the process is repeated beginning at element 1008. Otherwise, the search is stopped and $r_1$ is used as the next keyframe, as indicated at 1020.

Figure 5:
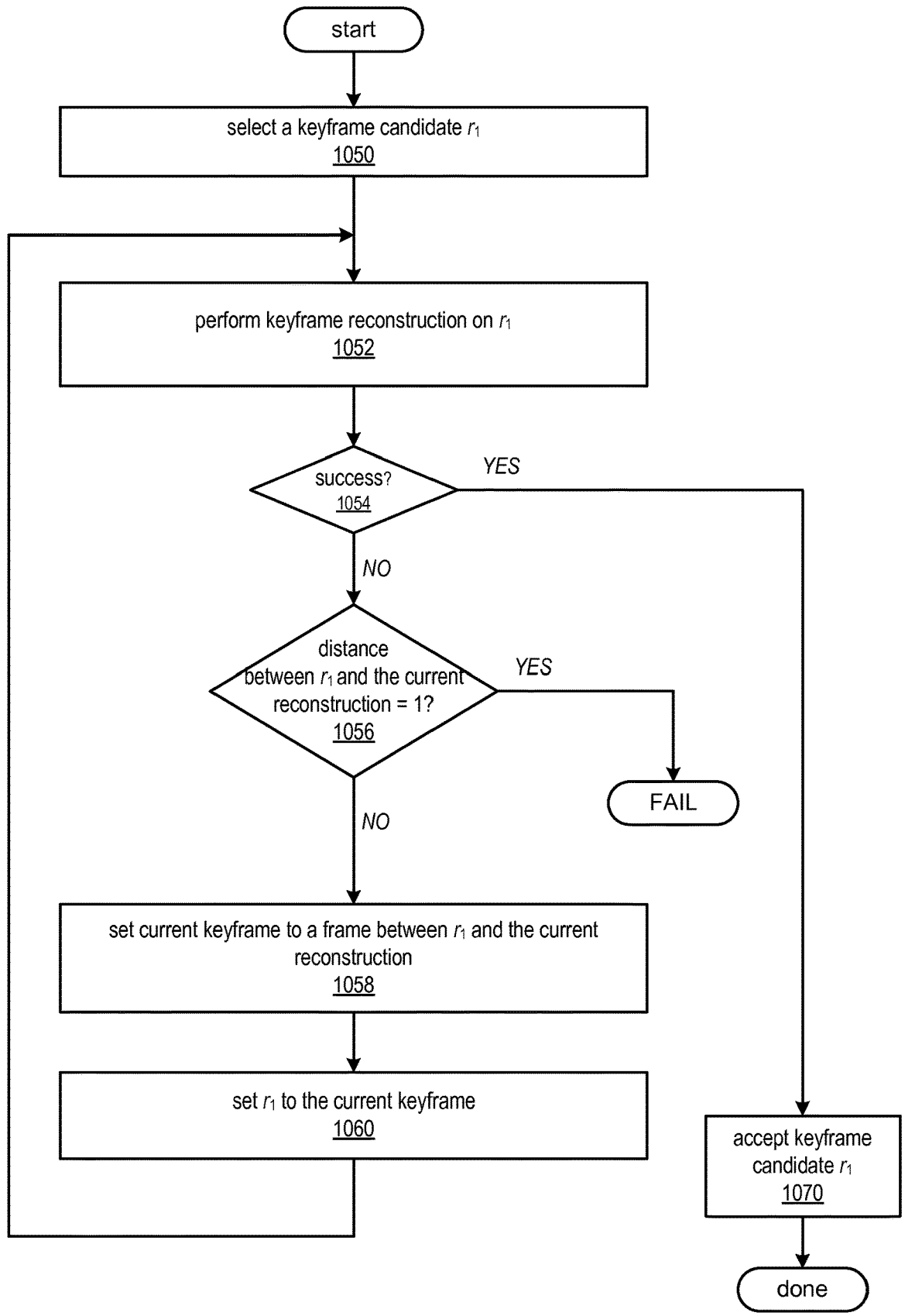
FIG. 5 is a flowchart of a method to decrease the distance between the current reconstructed set and the next keyframe that may be used in at least some embodiments.

The above method may increase the distance between the current reconstructed set and the next keyframe, but does not decrease the distance. However, it may be useful to be able to decrease the distance because the method may go out too far and there may not be enough overlapping points to support the keyframe computation (details in the section titled Keyframe reconstruction). Therefore, in at least some embodiments, the following may be performed to decrease the distance between the current reconstructed set and the next keyframe, if necessary. FIG. 5 is a flowchart of a method to decrease the distance between the current reconstructed set and the next keyframe that may be used in at least some embodiments.

As indicated at 1050, a keyframe candidate may be selected. In at least some embodiments, the method as illustrated in FIG. 4 may be used to select the keyframe candidate. Let $r_1$ be the index of the selected keyframe candidate.

As indicated at 1052, keyframe reconstruction may be performed on $r_1$. In at least some embodiments, an algorithm as described in the section titled Keyframe reconstruction may be performed on keyframe candidate $r_1$ to perform the keyframe reconstruction.

At 1054, if the keyframe reconstruction is successful, the method is done, and keyframe candidate $r_1$ is accepted, as indicated at 1070. Otherwise, at 1056, if the distance between $r_1$ and the current reconstruction is 1, the method quits and failure is declared. Otherwise, if the distance between $r_1$ and the current reconstruction is greater than 1 at 1056, the current keyframe is set to a frame between $r_1$ and the current reconstruction (e.g., the middle frame) as indicated at 1058, $r_1$ is set to the current keyframe as indicated at 1060, and the method returns to 1052 with the current frame as $r_1$.

Keyframe Reconstruction

This section describes methods for computing a new keyframe, for example a frame as selected in the previous section (Adaptive keyframe selection), according to some embodiments. Let the index of the new keyframe be s. The reconstructed camera that is closest to s is found. Let the index of this camera be $s_0$. All the points in $s_0$ and s are found In the case of calibrated cameras and uncalibrated cameras with a constant focal length, either the correct focal length or a good idea about the focal length (because it is constant and we have estimates from other frames) are available. In at least some embodiments, to make the algorithm more robust, the focal length may be fixed, and only the rotation parameter is estimated. In at least some embodiments, a 2-point based RANSAC algorithm may be used to compute an initial rotation.

In the case of uncalibrated cameras with a varying focal length, the focal length of $s_0$ is known, but not the focal length of s. In at least some embodiments, to estimate the focal length along with the camera rotation, a 2-point based RANSAC algorithm may be used to compute an initial rotation. In at least some embodiments, the initial rotation may be refined with a nonlinear optimization technique. In at least some embodiments, the nonlinear optimization technique refines the following cost functions depending on the focal length:

$$\operatorname*{argmin}_{R_s} \sum_{i=1}^{N} \psi_{i,s} \|x_{i,j} - \pi(K_s R_s x_i)\|^2 \qquad (D13)$$

$$\operatorname*{argmin}_{R_s, f_s} \sum_{i=1}^{N} \psi_{i,s} \|x_{i,j} - \pi(K_s(f_s) R_s x_i)\|^2 \qquad (D14)$$

The nonlinear optimization may provide a better estimate for the rotation and focal length. A next step is to add new points. In at least some embodiments, all the points that overlap both frames $s_0$ and s but that are not in either the inlier set or the outlier set of the current reconstruction are found. For each point, the optimal 2D coordinates may be computed using the newly estimated rotation parameters for keyframe s and the rotation parameters for keyframe $s_0$ from the current reconstruction. The points whose residuals are below a certain threshold may be added to the inlier set.

Keyframe Reconstruction, Refinement

In at least some embodiments, the newly reconstructed keyframe and the newly added points may be optimized together with the existing frames and points (global optimization). A goal is to obtain better estimates for all the parameters jointly. In at least some embodiments, a multi-view bundle adjustment is performed with all the cameras and all the points (see details in the section titled Optimization using multi-view bundle adjustment). After the bundle adjustment, points whose reprojection errors are too large may be removed (see details in the section titled Outlier removal); these points may be moved from the inlier set to the outlier set. All of the points in the outlier set may then be searched to find points that are consistent with the motion parameters (see details in the section titled Inlier recovery); these points may be moved from the outlier set to the inlier set. If the number of newly added inliers exceeds a threshold, which may be computed as a ratio of the number of the original points, an additional multi-view bundle adjustment may be performed (see details in the section titled Optimization using multi-view bundle adjustment).

Non-Keyframe Reconstruction

As indicated at 140 of FIG. 2, non-keyframes (keyframes that have not yet been included in the reconstruction) may be reconstructed. In at least some embodiments of a non-keyframe reconstruction technique, all of the frames in the input sequence that are not computed in the current reconstruction may be reconstructed. These frames may be referred to as non-keyframes. In at least some embodiments, the non-keyframe reconstruction technique may work on adjacent pairs of keyframes until all the pairs of keyframes have been processed. In at least some embodiments, for each pair, all the 2D points that are visible in both frames are collected. These points may then be used to compute the rotation and focal length, if needed, for a camera between the two frames, for example as described below.

Let r be the camera of interest. In at least some embodiments, the non-keyframe reconstruction technique may first interpolate the rotation parameters along with the focal length, if needed. In at least some embodiments, f and R may be further optimized by optimizing a cost function. In at least some embodiments, in the calibrated case and the uncalibrated case with a constant focal length, the cost function may be:

$$\operatorname*{argmin}_{R_r} \sum_{i=1}^{N} \psi_{i,r} \|x_{i,j} - \pi(K_r R_r x_i)\|^2 \qquad (D15)$$

In at least some embodiments, in the uncalibrated case with a varying focal length, the cost function may be:

$$\operatorname*{argmin}_{f_r, R_r} \sum_{i=1}^{N} \psi_{i,r} \|x_{i,j} - \pi(K_r(f_r) R_r x_i)\|^2 \qquad (D16)$$

In at least some embodiments, each frame between a pair of keyframes is computed independently of others, and each pair of keyframes is processed independently of other pairs.

Final Processing

As indicated at 150 of FIG. 2, final processing may be performed. In at least some embodiments, there may be two steps in the final processing.

In at least some embodiments, the largest contiguous subset of frames in the reconstruction may be found. All the frames that are not in this subset, along with all the points that are not visible in any of the frames in the subset, may be removed from the reconstruction.

In at least some embodiments, optionally, all of the frames and points in the reconstruction may be optimized (global optimization). In at least some embodiments, this optimization may be performed according to the refinement process described in the section titled Optimization using multi-view bundle adjustment to optimize all the points and cameras together.

Output and Example Applications

As indicated at 160 of FIG. 2, at least the camera intrinsic parameters and the rotation component of the camera motion for the images in the input image sequence may be output. Note that the reconstruction may have been cropped to the largest contiguous set of frames, as described in the section titled Final Processing. The output (at least the camera intrinsic parameters and the rotation component of the camera motion in an image sequence) of the rotation-based reconstruction technique may be used in a wide range of applications in different domains including but not limited to 3D image-based modeling and rendering, video stabilization, panorama stitching, video augmentation, vision based robot navigation, human-computer interaction, etc.

Bundle Adjustment Technique

In computer vision, bundle adjustment is the task of refining a reconstruction for a set of images or frames to obtain jointly optimal structure and motion parameter estimates. Optimal as used here indicates that the parameter estimates are found by minimizing some cost function that quantifies the model fitting error, while jointly as used here means that the solution is simultaneously optimal with respect to both structure and motion variations. The name "bundle adjustment" refers to the "bundles" of light rays leaving each three-dimensional (3D) point and converging on each camera center, which are then adjusted optimally with respect to both point and camera parameters. Bundle adjustment techniques may be employed in many computer vision techniques or workflows involving the processing of multiple images or frames, including but not limited to structure from motion (SFM) techniques.

A bundle adjustment technique is described that may detect and remove poorly conditioned points during bundle adjustment. The bundle adjustment technique may include a method to detect poorly conditioned points during the bundle adjustment process or portion of a feature-based 3D reconstruction pipeline, for example one or more of the reconstruction techniques as described herein such as the rotation-based SFM technique described herein or in a general 3D SFM technique. Once the poorly conditioned points are detected, the poorly conditioned points are removed from the bundle adjustment process. The technique may detect and remove the poorly conditioned points before optimization, and therefore may help to ensure that the optimization is successful.

The technique for detecting and removing poorly conditioned points may be employed at each application of bundle adjustment in a feature-based 3D reconstruction pipeline. The detection technique may be performed, and detected poorly conditioned points may be removed, prior to the optimization portion of the bundle adjustment technique. In at least some embodiments of the bundle adjustment technique, one or more structures for the optimization may be set up or initialized according to an input reconstruction. The detection technique may be applied to detect poorly conditioned points, and the poorly conditioned points may be collected and removed or marked so that they are not used during the optimization. The optimization may then be performed using only the well-conditioned points. Bundle adjustment may generally be an iterative optimization process, and thus the optimization output may be used as input to another iteration in which setup, the detection technique and point removal, and optimization are again performed. After bundle adjustment has completed, an optimized reconstruction that contains jointly optimal structure and motion parameter estimates may be output.

In at least some embodiments of the bundle adjustment technique, the Levenberg-Marquardt (L-M) algorithm may be used in bundle adjustment. In particular, a sparse bundle adjustment implementation using the L-M algorithm may be used in some embodiments. The detection technique can be applied at each iteration of the L-M algorithm (i.e., at every new Jacobian computation) to detect and remove poorly conditioned points prior to optimization at the current iteration of the L-M algorithm.

In a sparse bundle adjustment implementation using the L-M technique, a Jacobian matrix may be computed for an input reconstruction, and a 3×3 matrix V may be computed for all the points. The rank of $V_i$ for all the points may then be checked. If $V_i$ for a given point does not have full rank (rank 3), the matrix is rank-deficient and the corresponding point is declared or marked as poorly conditioned. All of the poorly conditioned points are collected and removed together. The bundle adjustment optimization can then be performed using the set of remaining, well-conditioned points. In at least some embodiments, detecting rank deficiency can be done numerically by checking the distribution of the eigenvalues of matrix $V_i$.

Example Implementations

Some embodiments may include a means for generating structure and motion for a set of images or frames according to the SFM techniques described herein. For example, an SFM module may receive input specifying a set of point trajectories and generate as output structure and motion for a set of images or frames as described herein. The SFM module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform one or more of the techniques as described herein. Other embodiments of the module(s) may be at least partially implemented by hardware circuitry and/or firmware stored, for example, in a non-volatile memory.

Figure 6:
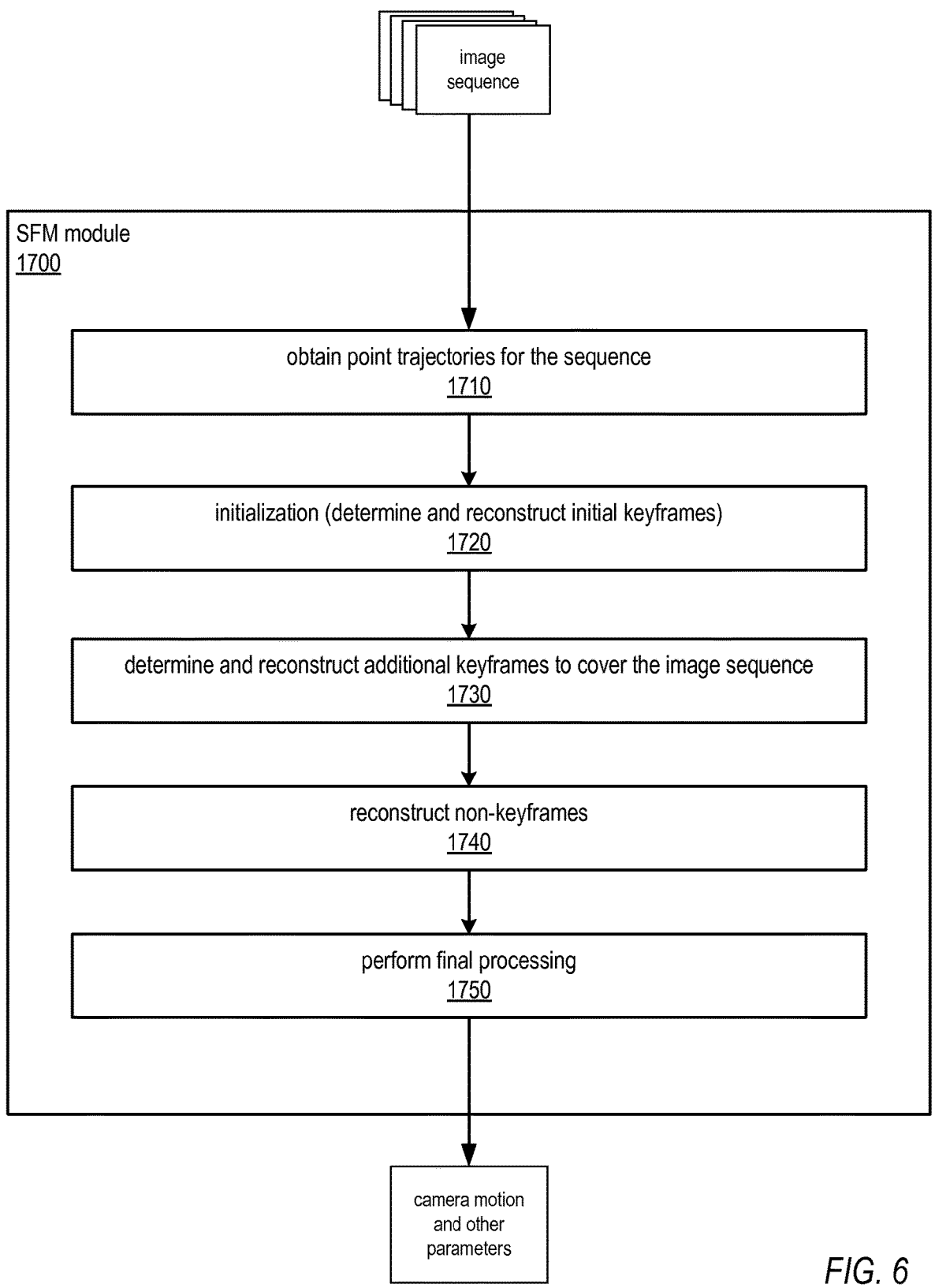
FIG. 6 illustrates a module that may implement one or more of the Structure from Motion (SFM) techniques and algorithms as described herein, according to at least some embodiments.
Figure 7:
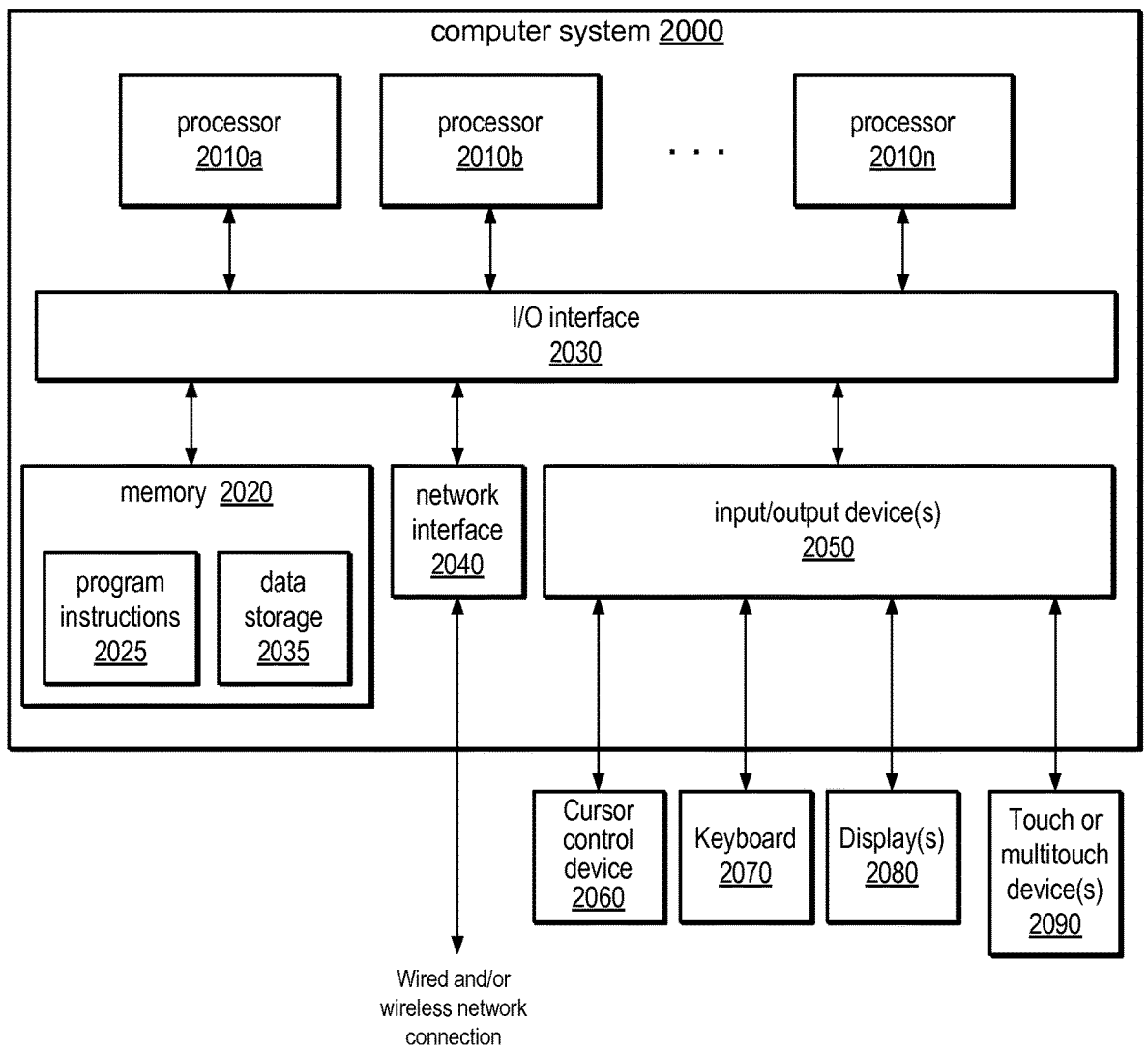
FIG. 7 illustrates an example computer system that may be used in embodiments.

Embodiments of the module may, for example, be implemented as a stand-alone application, as a module of an application, as a plug-in or plug-ins for applications including image or video processing applications, and/or as a library function or functions that may be called by other applications such as image processing or video processing applications. Embodiments of the module may be implemented in any image or video processing application, or more generally in any application in which video or image sequences may be processed. Example applications in which embodiments may be implemented may include, but are not limited to, Adobe® Premiere® and Adobe® After Effects®. "Adobe," "Adobe Premiere," and "Adobe After Effects" are either registered trademarks or trademarks of Adobe Systems Incorporated in the United States and/or other countries. An example module that may implement one or more of the SFM techniques as described herein is illustrated in FIG. 6. An example computer system on which the module may be implemented is illustrated in FIG. 7. Note that the module may, for example, be implemented in still cameras and/or video cameras.

FIG. 6 illustrates a module that may implement an SFM technique as illustrated in the accompanying Figures and described herein, according to at least some embodiments. Module 1700 may, for example, receive an input image sequence, or alternatively a set of point trajectories for the images in a sequence. Module 1700 then applies one or more of the techniques as described herein to generate structure, camera parameters, and motion. In at least some embodiments, module 1700 may obtain point trajectories for the sequence, as indicated at 1710. Module 1700 may then perform initialization to determine and reconstruct initial keyframes, as indicated at 1720. Module 1700 may then determine and reconstruct additional keyframes to cover the video sequence, as indicated at 1730. While not shown, in some embodiments, module 1700 may then determine and reconstruct optimizing keyframes between the keyframes in the current reconstruction to improve the reconstruction. Module 1700 may then reconstruct non-keyframes, as indicated at 1740. Module 1700 may then perform final processing, as indicated at 1750. In at least some embodiments, module 1700 may generate as output estimates of camera parameters and camera motion for the image sequence.

Example Applications

Example applications of the SFM techniques as described herein may include one or more of, but are not limited to, video stabilization, video augmentation (augmenting an original video sequence with graphic objects), video classification, and robot navigation. In general, embodiments of one or more of the SFM techniques may be used to provide structure and motion to any application that requires or desires such output to perform some video- or image-processing task.

Example System

Embodiments of the various techniques as described herein including the reconstruction techniques for generating structure, camera parameters, and motion from point trajectories may be executed on one or more computer systems, which may interact with various other devices. One such computer system is illustrated by FIG. 7. In different embodiments, computer system 2000 may be any of various types of devices, including, but not limited to, a personal computer system, desktop computer, laptop, notebook, or netbook computer, mainframe computer system, handheld computer, workstation, network computer, a camera, a video camera, a tablet or pad device, a smart phone, a set top box, a mobile device, a consumer device, video game console, handheld video game device, application server, storage device, a peripheral device such as a switch, modem, router, or in general any type of computing or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, display(s) 2080, and touch- or multitouch-enabled device(s) 2090. In some embodiments, it is contemplated that embodiments may be implemented using a single instance of computer system 2000, while in other embodiments multiple such systems, or multiple nodes making up computer system 2000, may be configured to host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, be implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the techniques disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may be configured to store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of the various techniques as described herein are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a computer-accessible medium may include storage media or memory media such as magnetic or optical media, e.g., disk or CD/DVD-ROM coupled to computer system 2000 via I/O interface 2030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/ output devices may be separate from computer system 2000 and may interact with one or more nodes of computer system 2000 through a wired or wireless connection, such as over network interface 2040.

As shown in FIG. 7, memory 2020 may include program instructions 2025, configured to implement embodiments of the various techniques as described herein, and data storage 2035, comprising various data accessible by program instructions 2025. In one embodiment, program instructions 2025 may include software elements of embodiments of the various techniques as illustrated in the above Figures. Data storage 2035 may include data that may be used in embodiments. In other embodiments, other or different software elements and data may be included.

Those skilled in the art will appreciate that computer system 2000 is merely illustrative and is not intended to limit the scope of the various techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a video camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
generating, by one or more computing devices, an initial reconstruction of camera motion for a plurality of frames in an image sequence, said generating comprises:
selecting a subset of the plurality of frames in the image sequence as keyframes;
selecting, from the keyframes, candidate adjacent-2 keyframe pairs, each one of said candidate adjacent-2 keyframe pairs including a pair of keyframes that are two keyframes apart from each other;
computing a score for each of the candidate adjacent-2 keyframe pairs, the score being computed based on point trajectories that overlap in the candidate adjacent-2 keyframe pairs;
identifying candidate adjacent-2 keyframe pairs having scores higher than a threshold value, the threshold value computed based on video dimensions of the image sequence;
selecting, from the identified candidate adjacent-2 keyframe pairs, a best pair of adjacent-2 keyframe pairs based on the computed score; and
generating the initial reconstruction according to the selected best pair of adjacent-2 keyframe pairs.

2. The method as recited in claim 1, wherein the generating is performed on the rotation component of camera motion in the image sequence.

3. The method as recited in claim 1, wherein the keyframes are temporally spaced frames in the plurality of frames of the image sequence.

4. The method as recited in claim 1, further comprising:
obtaining a plurality of point trajectories for the image sequence, each point trajectory tracking a feature across two or more of the frames in the plurality of frames of the image sequence;
determining and reconstructing, according to the plurality of point trajectories, additional keyframes to cover the image sequence, wherein said determining and reconstructing additional keyframes comprises:
selecting a next keyframe to be added to the initial reconstruction from a set of the keyframes that are not covered by the initial reconstruction;
reconstructing the rotation component of camera motion for the selected next keyframe according to at least a portion of a set of point trajectories for the image sequence, such that said reconstructing adds the selected next keyframe to the initial reconstruction; and repeating said selecting and said reconstructing until the image sequence is covered.

5. The method as recited in claim 4, further comprising globally optimizing the reconstruction after adding one or more additional frames to the reconstruction by refining the reconstruction according to a nonlinear optimization technique applied globally to the reconstruction.

6. The method as recited in claim 4, further comprising:
determining one or more outlier points in the reconstruction and removing the determined outlier points from the reconstruction, wherein the outlier points are added to a set of outlier points; and determining one or more inlier points from the set of outlier points and adding the determined inlier points to the reconstruction.

7. The method as recited in claim 1, wherein camera intrinsic parameters are known for the input image sequence.

8. The method as recited in claim 4, wherein one or more camera intrinsic parameters are not known for the input image sequence, the method further comprising estimating the one or more camera intrinsic parameters for each frame added to the reconstruction.

9. A system, comprising:
one or more processors; and
a memory comprising program instructions, wherein the program instructions are executable by at least one of the one or more processors to generate an initial reconstruction of camera motion for a plurality of frames in an image sequence, the program instructions are executable by at least one of the one or more processors to:
select a subset of the plurality of frames in the image sequence as keyframes;
select, from the keyframes, candidate adjacent-2 keyframe pairs, each one of said candidate adjacent-2 keyframe pairs including a pair of keyframes that are two keyframes apart from each other;
compute a score for each of the candidate adjacent-2 keyframe pairs, the score being computed based on point trajectories that overlap in the candidate adjacent-2 keyframe pairs;
identify candidate adjacent-2 keyframe pairs having scores higher than a threshold value, the threshold value computed based on video dimensions of the image sequence;
select, from the identified candidate adjacent-2 keyframe pairs, a best pair of adjacent-2 keyframe pairs based on the computed score; and
generate the initial reconstruction according to the selected best pair of adjacent-2 keyframe pairs.

10. The system as recited in claim 9, wherein the generating is performed on the rotation component of camera motion in the image sequence.

11. The system as recited in claim 9, wherein after generating the initial reconstruction, the program instructions are executable by at least one of the one or more processors to:
obtain a plurality of point trajectories for the image sequence, each point trajectory tracking a feature across two or more of the frames in the plurality of frames of the image sequence;
determine and reconstruct, according to the plurality of point trajectories, additional keyframes to cover the image sequence, wherein said determination and reconstruction of additional keyframes comprises program instructions executable by the at least one of the one or more processors to:
select a next keyframe to be added to the initial reconstruction from a set of the keyframes that are not covered by the initial reconstruction;
reconstruct the rotation component of camera motion for the selected next keyframe according to at least a portion of a set of point trajectories for the image sequence, such that said reconstruction adds the selected next keyframe to the initial reconstruction; and
repeat said selection and said reconstruction until the image sequence is covered.

12. The system as recited in claim 11, wherein the program instructions are further executable by at least one of the one or more processors to globally optimize the reconstruction after adding one or more additional frames to the reconstruction by refining the reconstruction according to a nonlinear optimization technique applied globally to the reconstruction.

13. The system as recited in claim 11, wherein one or more camera intrinsic parameters are not known for the input image sequence, such that the program instructions are further executable by at least one of the one or more processors to estimate the one or more camera intrinsic parameters for each frame added to the reconstruction.

14. A non-transitory computer-readable storage medium storing program instructions, wherein the program instructions are computer-executable to implement:
generating, by one or more computing devices, an initial reconstruction of camera motion for a plurality of frames in an image sequence, said generating comprises:
selecting a subset of the plurality of frames in the image sequence as keyframes;
selecting, from the keyframes, candidate adjacent-2 keyframe pairs, each one of said candidate adjacent-2 keyframe pairs including a pair of keyframes that are two keyframes apart from each other;
computing a score for each of the candidate adjacent-2 keyframe pairs, the score being computed based on point trajectories that overlap in the candidate adjacent-2 keyframe pairs;
identifying candidate adjacent-2 keyframe pairs having scores higher than a threshold value, the threshold value computed based on video dimensions of the image sequence;
selecting, from the identified candidate adjacent-2 keyframe pairs, a best pair of adjacent-2 keyframe pairs based on the computed score; and
generating the initial reconstruction according to the selected best pair of adjacent-2 keyframe pairs.

15. The non-transitory computer-readable storage medium as recited in claim 14, wherein the generating is performed on the rotation component of camera motion in the image sequence.

16. The non-transitory computer-readable storage medium as recited in claim 14, further comprising:
obtaining a plurality of point trajectories for the image sequence, each point trajectory tracking a feature across two or more of the frames in the plurality of frames of the image sequence;
determining and reconstructing, according to the plurality of point trajectories, additional keyframes to cover the image sequence, wherein said determining and reconstructing additional keyframes comprises:

selecting a next keyframe to be added to the initial reconstruction from a set of the keyframes that are not covered by the initial reconstruction;

reconstructing the rotation component of camera motion for the selected next keyframe according to at least a portion of a set of point trajectories for the image sequence, such that said reconstructing adds the selected next keyframe to the initial reconstruction; and repeating said selecting and said reconstructing until the image sequence is covered.

17. The non-transitory computer-readable storage medium as recited in claim 16, wherein the program instructions are further computer-executable to implement globally optimizing the reconstruction after adding one or more additional frames to the reconstruction, such that said globally optimizing the reconstruction refines the reconstruction according to a nonlinear optimization technique applied globally to the reconstruction.

18. The non-transitory computer-readable storage medium as recited in claim 16, wherein the program instructions are further computer-executable to implement:

determining one or more outlier points in the reconstruction and removing the determined outlier points from the reconstruction, such that the outlier points are added to a set of outlier points; and determining one or more inlier points from the set of outlier points and adding the determined inlier points to the reconstruction.

19. The non-transitory computer-readable storage medium as recited in claim 16, wherein one or more camera intrinsic parameters are not known for the input image sequence, such that the program instructions are further computer-executable to implement estimating the one or more camera intrinsic parameters for each frame added to the reconstruction.

20. The non-transitory computer-readable storage medium as recited in claim 14, wherein camera intrinsic parameters are known for the input image sequence.

\* \* \* \* \*